June 12, 1934.  G. N. GOODRICH ET AL  1,963,018
BATTERY GRID PASTING MACHINE
Filed Oct. 27, 1930   4 Sheets-Sheet 1
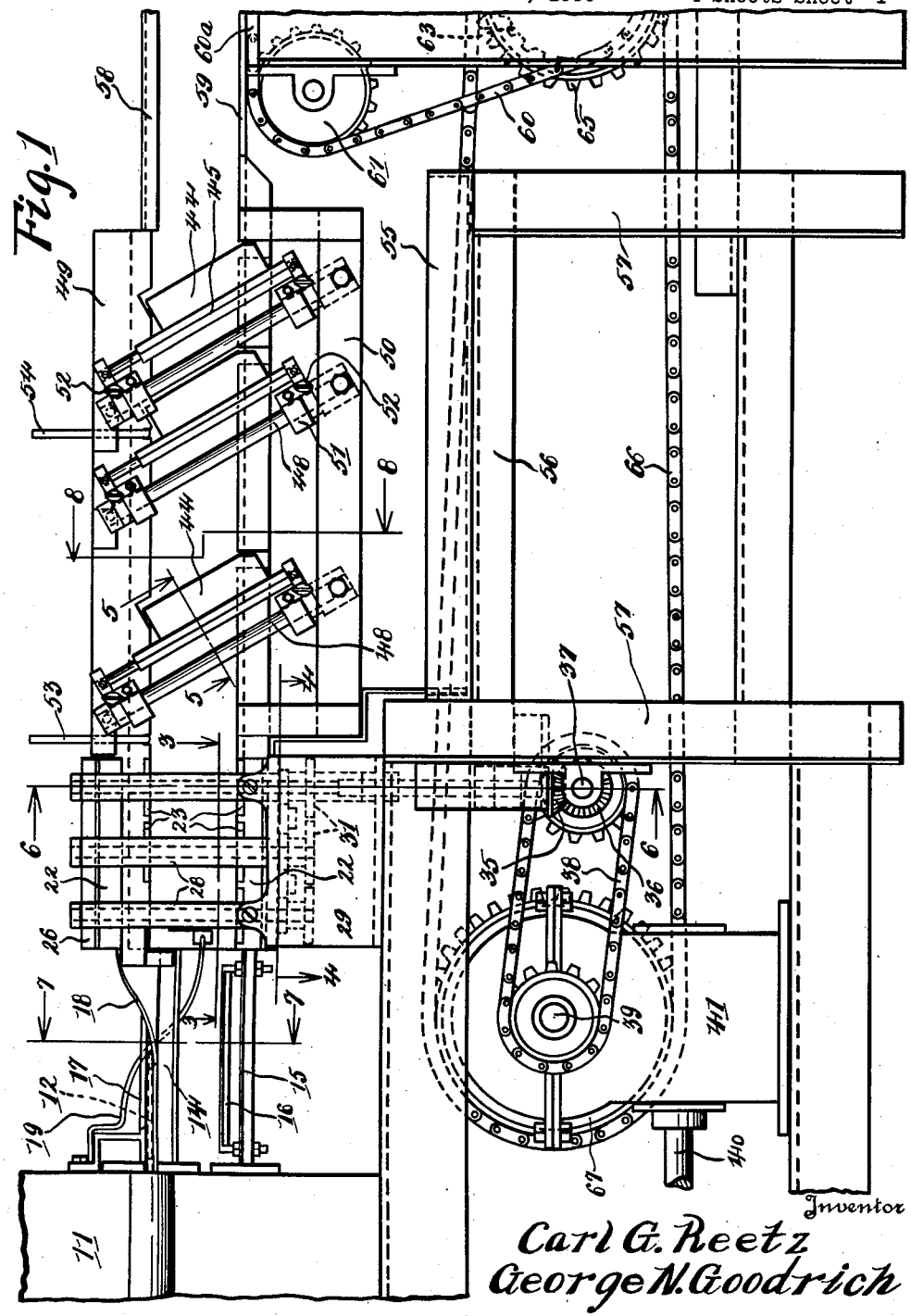
Inventor
Carl G. Reetz
George N. Goodrich
By Stryker & Stryker
Attorneys

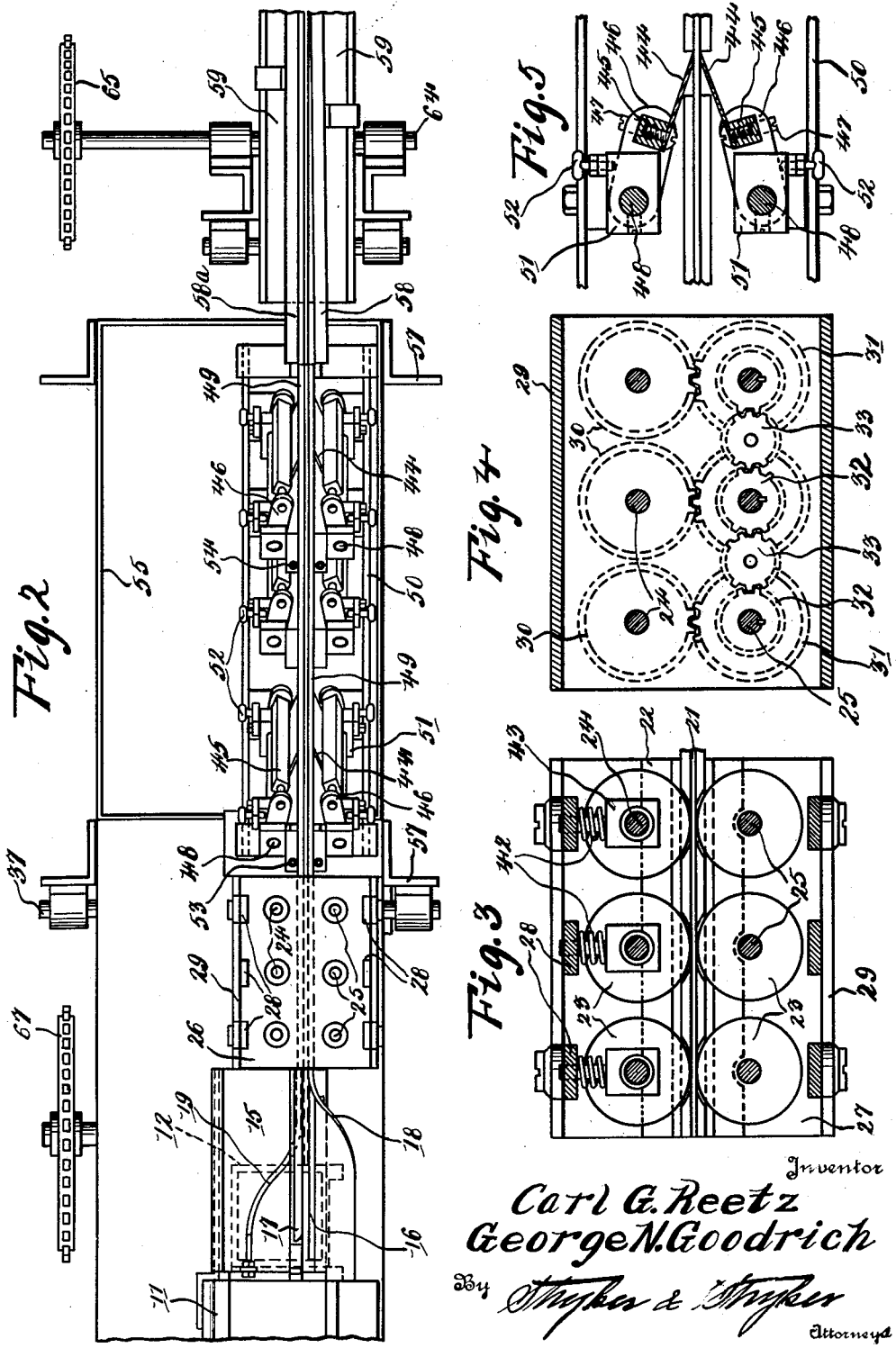

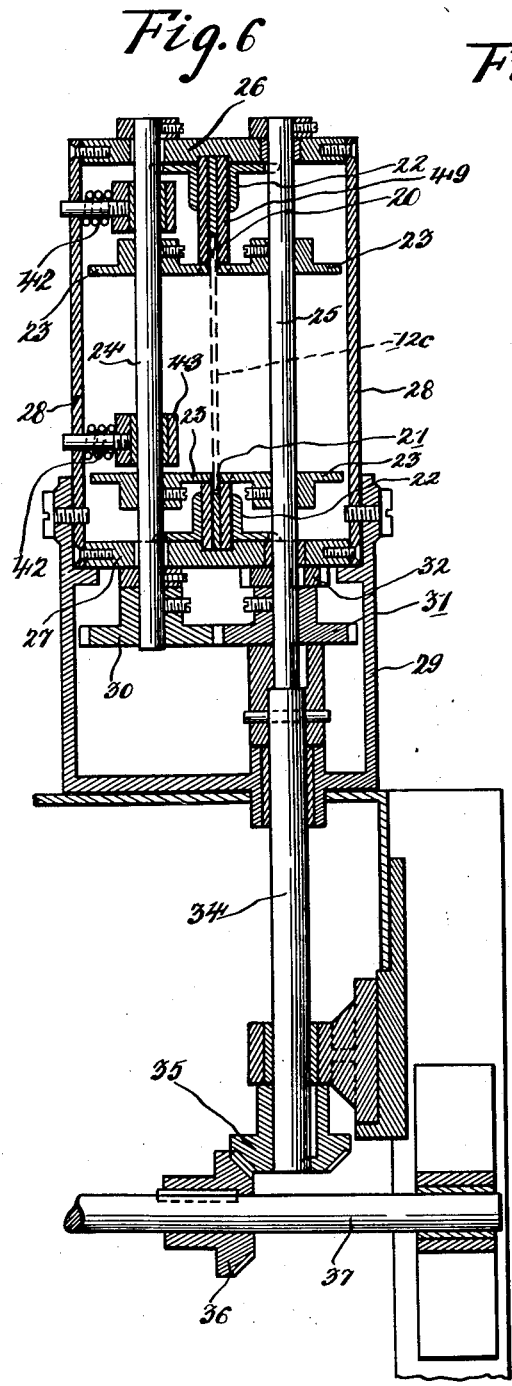
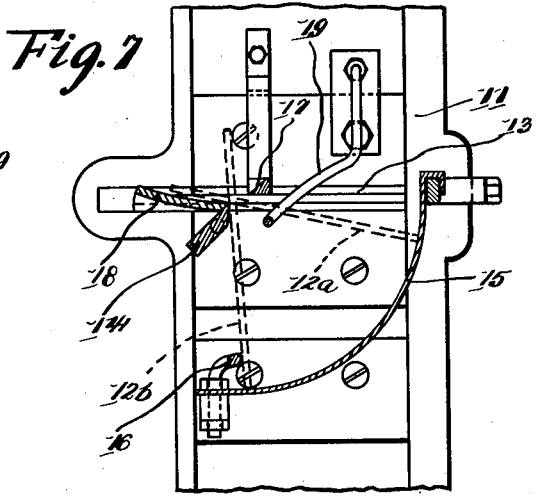
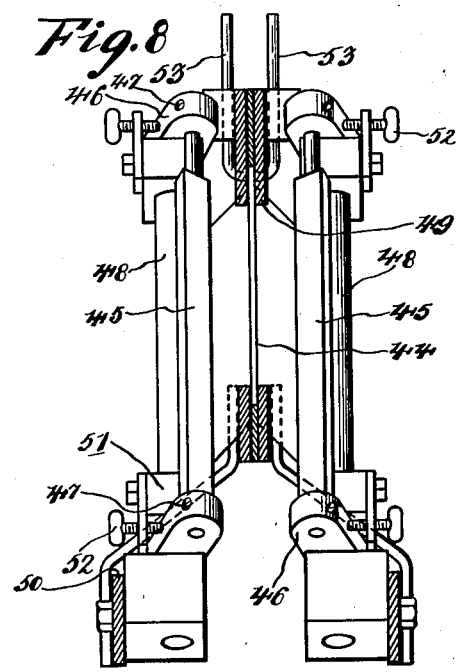

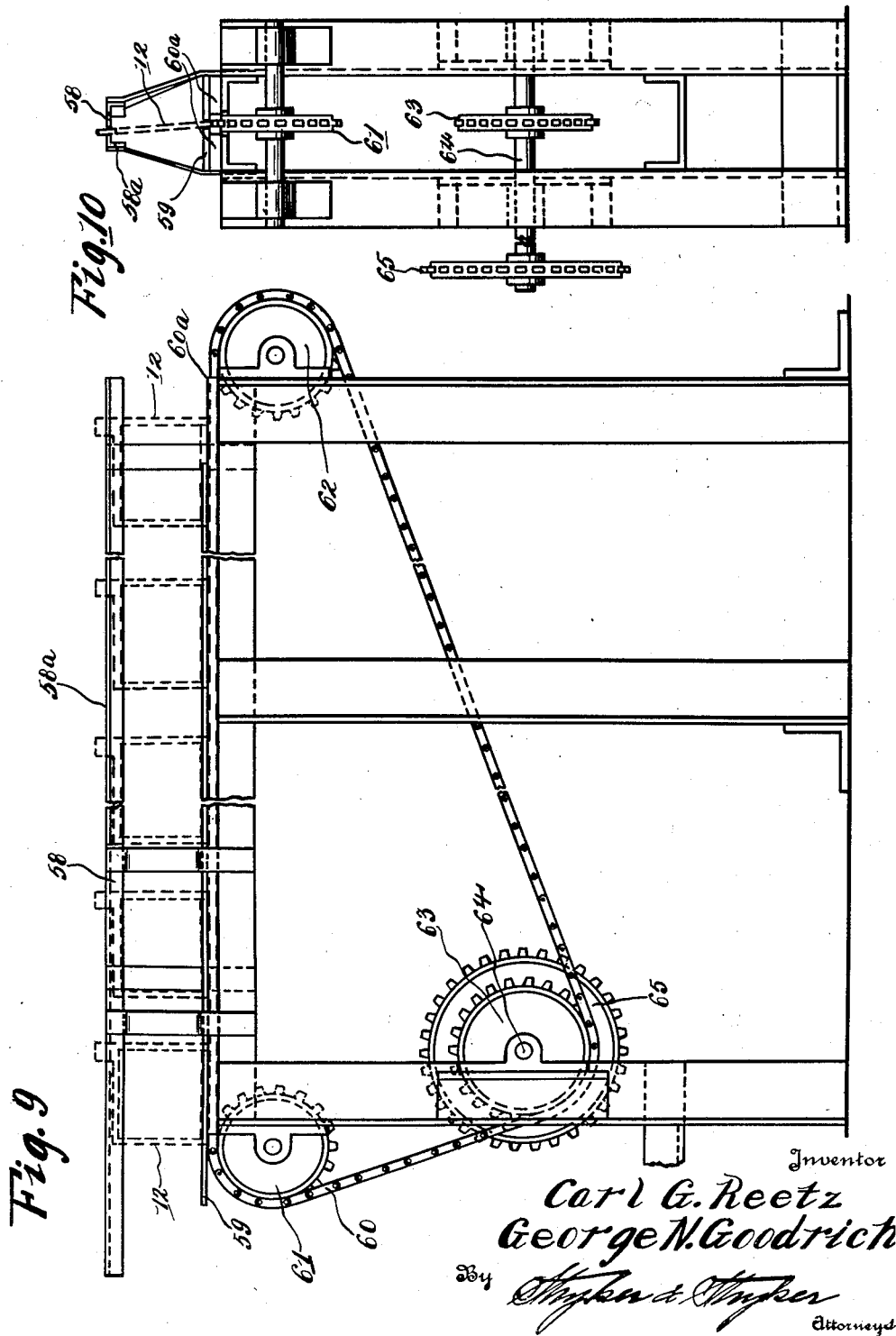

Patented June 12, 1934

1,963,018

UNITED STATES PATENT OFFICE 1,963,018

BATTERY GRID PASTING MACHINE

George N. Goodrich and Carl G. Reetz, St. Paul, Minn., assignors to National Battery Company, St. Paul, Minn., a corporation of Delaware Application October 27, 1930, Serial No. 491,574

12 Claims. (Cl. 226—39)

This invention relates to the manufacture of grids for storage batteries, and particularly to mechanism for automatically troweling or finishing grids which have been supplied with the active material or paste.

It is the present general practice in filling battery grids with paste to retain the grids in horizontal position during the operation of filling the interstices and also during the subsequent troweling or finishing operation. A machine of this type is described and claimed in our copending application, Serial No. 448,136, filed April 28, 1930. We have discovered, however, that although the grids may be advantageously filled while in horizontal position, a greatly improved product results if the troweling or finishing operation is performed while retaining the grids in vertical position. This is particularly true where the troweling is performed rapidly as in machines having the greater production capacities. To insure proper filling of the interstices it is important that at least a small excess of paste be applied to the grid and that after or during the smoothing or troweling operation this excess shall be removed uniformly from both faces of each grid. In our improved machine the grids are held in vertical position during the troweling so that the removal of this excess is greatly facilitated and uniform packing and smooth surfacing of the paste results. The operation of our machine is unusually rapid and hand work is reduced to a minimum.

The invention will be best understood by reference to the accompanying drawings in which Figure 1 is a side elevation of the machine with a portion of the delivery mechanism removed; Fig. 2 is a plan view of the same; Fig. 3 is a horizontal section taken on the line 3—3 of Fig. 1; Fig. 4 is a similar section taken on the line 4—4 of Fig. 1; Figs. 5, 6, 7 and 8 are sections taken respectively on the lines 5—5, 6—6, 7—7 and 8—8 of Fig. 1; Fig. 9 is a side elevation of the delivery mechanism and Fig. 10 is an end view of the same.

The machine of the present invention may be substituted for the troweling mechanism shown in our copending application Serial No. 448,136 for Pasting machines. In the drawings we have indicated by the numeral 11 a fragmentary portion of the machine for more or less loosely filling the interstices in grids 12 with paste. The loosely filled grids 12 are delivered from the machine 11 in horizontal position, as indicated in Figs. 1 and 2. They are thus continuously supplied in edge to edge engagement with each other and pass out from the machine 11 through a horizontal slot 13 (Fig. 7).

The first operation in our improved machine is to turn the grids from horizontal to vertical position and for this purpose a series of guide members are arranged to support one lateral edge of each grid while permitting the other lateral edge to fall. A longitudinal guide member 14 extends horizontally from the slot 13 to support one lateral edge of each grid and an arcuate guide member 15 is disposed adjacent to the opposite edge to allow the grids to move successively to a series of positions, such as those indicated at 12a and 12b in Fig. 7. A third guide member 16 extends parallel to the member 14 to stop turning of the grids when they reach the desired, substantially vertical position, while a fourth guide member 17 is arranged to guide the upper portion of the grids to prevent their falling to horizontal position. As soon as a grid is free of the slot 13 it is thus caused to turn, principally by force of gravity, to vertical position. To guard against possible obstruction of the free turning movement, we provide additional curved guides 18 and 19 adapted to positively actuate the grids to vertical position. The guide 18 is a cam-like curved member designed to raise the lug of the grids while the guide 19 is designed to strike the upper face of each grid and turn it to vertical position with the guide member 14 as a pivot.

The delivery ends of the several guide members above described are arranged to direct the grids in their vertical positions 12c between and into guide channels 20 and 21 formed by spaced, parallel bars secured to longitudinal angle bars 22 (Fig. 6). Pairs of feed disks 23 are arranged to engage the grids adjacent to the channels 20 and 21 and these disks are positively driven in timed relation to the machine 11 and to each other. The disks are mounted in pairs on vertical shafts 24 and 25 having suitable bearings carried by an upper frame member 26 and by a lower frame member 27. These frame members 26 and 27 are secured in spaced parallel relation to each other by vertical bars 28. Beneath the frame member 27 and supporting the same is a housing 29 for gears adapted to operatively connect the several shafts 24 and 25. As shown in Figs. 4 and 6, each shaft 24 is provided with a gear 30 in mesh with a gear 31 secured to the shaft 25. Fixed on the shafts 25 are pinions 32 and the several pinions 32 are suitably connected by pinions 33. One of the shafts 25 has a coaxial drive shaft 34 secured to its lower end. This shaft 34 projects from the bottom of the housing 29 and its lower end is supported in a suitable bearing and carries a beveled pinion 35 adapted to be driven by a similar pinion 36 on a horizontal shaft 37. The shaft 37 is, in turn, driven by a chain 38 and sprocket wheels connecting it to a shaft 39. A suitable motor (not shown) is adapted to drive a shaft 40 connected to the shaft 39 through suitable speed reducing gears in a housing 41.

Each shaft 24 is urged horizontally toward its companion shaft 25 by coiled springs 42 engaging movable bearings 43 for the shaft 24. The springs 42 are confined on suitable coaxial pins extending between the bearings 43 and frame members 28. Thus the driving disks 23 at one side of the path of the grids are urged toward the coacting drive disks so as to resiliently grip the grids for feeding them along the guides.

The top and bottom channel guides 20 and 21 continue from the feeding disks 23 between pairs of troweling blades 44. Each of these blades is a flexible metal plate extending obliquely toward the vertically disposed grids and each having an edge for engaging the grids extending in a vertical plane and obliquely upward and backward from the lower edge of the grid. Each blade 44 is secured to a bar 45 extending obliquely parallel to the blade edge and pivotally supported on arms 46. Set screws 47 are provided to secure the bars 45 against rotation in the arms 46. Each pair of arms 46 for supporting a bar 45 is swiveled on a rod 48 having bearings secured to upper frame members 49 and lower frame members 50. Fixed on the rods 48 are pairs of small clamps 51 and a set screw 52 is arranged in each of the clamps 51 to engage an arm 46 and urge the free end of said arm toward the grids in the guide channels. The angle of the blade 44 relative to the vertical faces of the grids may be adjusted by suitable manipulation of the set screws 47 and 52 and by turning the bars 45 in the arms 46 while the latter arms are pivoted on the rods 48. Pressure of the blades on the grids may be quickly and easily adjusted by manipulating the set screws 52 having wing heads.

Pairs of water supply tubes 53 and 54 are arranged, as best shown in Figs. 1 and 8, to deliver small streams of water to both faces of the vertically disposed grids near their upper edges. The excess paste and moisture from each grid is removed obliquely downward by the blades 44 and falls into a pan 55 located beneath the troweling mechanism and supported on frame members 56 extending between pairs of supporting legs 57 for the machine. To insure smooth passage of the grids along the guides for turning them from horizontal to vertical position, we also deliver small streams of water to said guides, the streams being delivered by one or more small tubes like the tubes 53 and 54.

From the troweling mechanism grids pass on in vertical position to a long delivery conveyor from which they are removed and placed in racks for drying. The delivery conveyor is designed to increase the speed of the grids and thereby space them, one from another, to facilitate removal and inspection. Upper angle bars 58 and 58a are arranged in continuation of the channel guide 20 and at the lower edges of the grids a pair of spaced bars 59 form a continuation of the guide channel 21. Beneath the surfaces of the bars 59 an endless chain 60 supports and conveys the grids, as best shown in Figs. 9 and 10. The chain 60 has guide sprocket wheels 61 and 62 at opposite ends of the delivery mechanism and is driven by a sprocket wheel 63 fixed on a shaft 64. The latter shaft is in turn driven by a sprocket wheel 65 operated by an endless chain 66 which is driven, in turn, by a large sprocket wheel 67 fixed on the power-driven shaft 39. The upper run of the chain 60 has a suitable support to retain it in horizontal position and, at each side, said run is confined between bars 60a.

To facilitate removal of the grids, the guide angle 58 terminates a short distance from the receiving end of the delivery mechanism and the other guide angle 58a continues in a line offset laterally from the lower guide bar 59 so as to permit the grids to lean slightly to one side from their vertical position as indicated in Fig. 10. In this manner the grids are held in substantially upright position but one face or side of each is left entirely free during their passage along the delivery mechanism. The operators who inspect the grids and place them in the racks are stationed opposite the free faces of the grids.

*Operation*

In operation the grids are fed in horizontal position from the pasting machine 11 through the slot 13 and as soon as each grid is free of said slot it is turned to vertical position by pivotal movement about the guide member 14, as hereinbefore more fully described. The grids now pass in vertical position between the upper and lower guide channels 20 and 21 and are immediately gripped between the feed disks 23 and forcibly advanced in edge to edge engagement with each other along said guide channels which continue past the troweling blades 44. The tubes 53 and 54 supply water to moisten both faces of the grids near the blades 44. These blades are so adjusted that they press and distribute the more or less loose paste firmly and uniformly into the grid openings and at the same time smooth the previously moistened surfaces and remove the excess paste and moisture obliquely downward. The excess drops into the pan 55 whence it may be removed periodically and used again. The grids continue in edge to edge engagement with each other until they reach the chain 60 which is operated at an increased lineal speed so as to space the grids and carry them along between the guide angles 58 and 58a and plates 59. When the grids reach the end of the guide angle 58 they are caused to lean against the angle 58a and thereafter they may be readily removed from between the guide plates 59.

We have found that our improved machine reduces the cost of the grids by reason of its rapid operation and at the same time proper uniformity, smooth faces and firm packing of both sides of the grids is insured.

Having described our invention what we claim as new and desire to protect by Letters Patent is:

1. The combination with means for filling battery grids with paste and for delivering the filled grids in substantially horizontal position, of means for turning the grids successively to substantially vertical position and means for troweling the opposite faces of said grids while in said last mentioned position.

2. The combination with means for filling battery grids with paste and for delivering the filled grids in horizontal position, of means for turning the grids successively to vertical position, means for troweling the vertical faces of said grids and means for feeding the grids in continuous, edge to edge, engagement with each other during the troweling operation.

3. The combination with means for filling battery grids with paste and for delivering the filled grids in horizontal position, of means for turning the grids successively to vertical position and means for troweling the vertical faces of said grids, said troweling means being arranged to remove excess paste obliquely downward from said faces.

4. In a machine of the class described, a guideway for grids in substantially vertical position, said guideway having pairs of upper and lower guide surfaces to confine the grids in edge to edge contact with each other while leaving the faces of the grids exposed, means for forcibly advancing the grids along said guideway, troweling blades having obliquely disposed edges arranged in pairs to engage opposite faces respectively of the grids on said guideway, each of said blades comprising a substantially plane, thin, flexible member extending at such acute angle to the face of the grids as to compress and smooth the paste therein and to simultaneously remove excess paste from opposite faces of said grids during their passage along said guideway.

5. In a machine of the class described, a guideway for grids in substantially vertical position, said guideway having pairs of upper and lower guide surfaces to confine the grids in edge to edge contact with each other while leaving the faces of the grids exposed, means for forcibly advancing the grids along said guideway, troweling blades having obliquely disposed edges arranged in pairs to engage opposite faces respectively of the grids moving along said guideway, each of said blades comprising a substantially plane, thin, flexible member extending at such acute angle to a face of the grids as to compress and smooth the paste therein, the edges of said blades in contact with the grids being inclined from the upper guide surfaces obliquely down and in the direction of movement of the grids to simultaneously remove excess paste obliquely downward from opposite faces of said grids during their passage along said guideway.

6. In a machine of the class described, a guideway for grids in vertical position, said guideway having pairs of upper and lower guide surfaces to confine the grids in edge to edge contact with each other while leaving the faces of the grids exposed, a series of pivot rods extending in vertical planes adjacent to both faces of the grids on said guides, troweling blades severally secured to said rods and each comprising a thin, flexible member extending at such acute angle to the face of the grids as to compress and smooth the paste thereon and to remove excess paste from opposite, vertical faces of said grids during their passage along said guideway, means for forcibly advancing the grids along said guideway in edge to edge contact with each other and adjustable means for actuating said blades toward the grids.

7. In a machine of the class described, a guide adapted to receive grids in substantially horizontal position, means for turning said grids successively from said horizontal to substantially vertical position, feeding mechanism having rotary elements adapted to grip the grids in said last mentioned position, a guideway for the grids in substantially vertical position and troweling means engaging opposite faces of the grids in said guideway.

8. In a machine of the class described, a guide adapted to receive grids in substantially horizontal position, means for turning said grids successively from said horizontal to substantially vertical position, feeding mechanism having rotary elements adapted to grip the grids in substantially vertical position and advance them, in edge to edge contact with each other, for troweling, a guideway for the grids in substantially vertical position, troweling means engaging opposite faces of the grids in said guideway, a second guideway adapted to receive the grids from said first mentioned guideway and means for advancing the grids along said second guideway.

9. In a machine of the class described, a guide adapted to receive grids in substantially horizontal position, means for turning said grids successively from said horizontal to substantially vertical position, feeding mechanism having rotary elements adapted to grip the grids in said vertical position, a guideway for the grids in said vertical position, troweling blades engaging opposite, substantially vertical faces of the grids in said guideway, said feeding means being arranged to advance the grids in edge to edge engagement with each other along said guideway, a second guideway adapted to receive the grids from said first mentioned guideway and means for advancing the grids along said second guideway at an increased speed to space them.

10. In a machine of the class described, a guide adapted to receive grids in substantially horizontal position, said guide being adapted to permit the dropping of one lateral edge of the grid and having a member adapted to pivotally support the other lateral edge of the grid, a continuation of said guide formed to receive and retain the grids in substantially vertical position, and means for troweling the substantially vertical faces of the grids in said continuation.

11. In a machine of the class described, a guide adapted to receive grids in substantially horizontal position, said guide having an arcuate member adapted to permit the dropping of one lateral edge of the grid and having another member adapted to constitute a pivot support for the other lateral edge of the grid and a third guide member arranged beneath said second guide member to stop pivotal movement of the grids and guide the same in substantially vertical positions.

12. In a machine of the class described, a guide adapted to receive grids in substantially horizontal position, said guide being adapted to permit the dropping of one lateral edge of the grid and having a member adapted to support the other lateral edge of the grid, a continuation of said guide formed to retain the grids in substantially vertical position, means for troweling the substantially vertical faces of the grids in said continuation and means for moving the grids along said continuation.

CARL G. REETZ.
GEORGE N. GOODRICH.